United States Patent Office 3,127,335
Patented Mar. 31, 1964

3,127,335
PROCESS FOR PREPARING ACI-AROMATIC NITRO COMPOUNDS
George Henry Dorion, New Canaan, and Kay Oesterle Loeffler, Norwalk, Conn., assignors to American Cyanamid Company, Stamford, Conn., a corporation of Maine
No Drawing. Filed June 22, 1962, Ser. No. 204,635
4 Claims. (Cl. 204—158)

This invention relates to a novel process for the preparation of reversible light-sensitive compounds. More particularly, it relates to a process for preparing aci-aromatic nitro compounds. Still more particularly, the invention is concerned with the rapid conversion of aromatic nitromethane compounds to their corresponding aci-form utilizing non-chemical means.

It is known that relatively unstable aci-aromatic nitromethane compounds characterized by the structure: $RCH=NO_2H$, wherein R is an aromatic nucleus, can be prepared by chemical means. One such method which involves a series of reactions commencing with the reaction of sodium ethoxide, benzyl cyanide and methyl nitrate, is disclosed in Organic Synthesis, collective volumes II, at page 514. Unfortunately, the synthesis is time consuming and difficult. Usually it requires about seventy-two hours, or more. Since aci-aromatic nitromethane compounds are gaining in commercial prominence due to their reversible light characteristics, a rapid, non-chemical method for preparing such aci-nitro compounds would be highly desirable.

It is a principal object of the present invention to provide a method for preparing rapidly aci-aromatic nitro compounds. It is a further object of the invention to provide aci-aromatic nitromethanes from the corresponding stable, tautomeric aromatic nitromethane utilizing non-chemical means. A still further object is to provide the rapid conversion of aromatic nitro compounds in a straightforward manner utilizing specific irradiation techniques at lower than freezing temperatures. Other objects and advantages will become apparent from a consideration of the ensuing description.

To this end, a stable aromatic nitromethane compound is converted to the corresponding aci-form within about five minutes and not more than about one hour by subjecting the nitro compound to irradiation at temperatures of minus (—) 40° C., or below. It has been unexpectedly found that stable aromatic nitromethane compounds which are usually yellow in color, are rapidly tautomerized when exposed to ultraviolet light at temperatures of about minus (—) 40° C., or below, so as to convert a yellow-colored substance to a yellow-brown solid.

Although any aromatic nitromethane, such as for instance phenylnitromethane, tolylnitromethane, xylylnitromethane, nitrophenylnitromethane, biphenylmethane, naphthylnitromethane, α-methylnaphthylnitromethane and 1,4-dimethylnaphthylnitromethane, can be employed in the process of the instant invention, phenylnitromethane will be specifically exemplified.

Irradiation is supplied from an ultraviolet light source providing from about 2500 A. units to about 4000 A. units, and providing preferably between about 3000 A. units and 3800 A. units. Such light sources are illustratively a sun lamp, fluorescent light, and sunlight.

In order to effect conversion to the desirable aci-form in which a color change is detectable, temperatures of at least minus (—) 40° C., or below, are required as previously mentioned. A good operating temperature for obtaining conversion is in the range from about minus (—) 40° C. to about minus (—) 100° C. and preferably between minus (—) 70° C. and minus (—) 80° C.

The significance of the process of the invention can be readily appreciated from a consideration of the nature of the conversion from the stable aromatic nitromethane form at room temperature to the corresponding unstable aci-form. For instance, small quantities from 0.5% to 10% of the stable aromatic nitro compound on a weight basis can be readily admixed with a variety of polymeric materials, such as for instance substantially colorless polymethylmethacrylate, polystyrene, cellulose acetate, or the like, and treated in accordance with the process of the invention. Color change in the polymeric materials due to aci-form is readily detected.

In one illustrative example, a 40% solution on a weight basis, of substantially colorless polymethylmethacrylate in methylethyl ketone solvent is prepared. One part of phenylnitromethane, based on the weight of polymethylmethacrylate, is admixed with the so-prepared solution. A film or plate of polymeric solution is cast on a suitable strippable surface. The ketone solvent is next evaporated therefrom and the film or plate is stripped from its strippable surface. Resultant yellow-colored plate is subjected to cooling at a temperature between about minus (—) 70° C. and minus (—) 80° C. The plate is exposed at the stated temperature to ultraviolet light emanating from a sun lamp. Change of the plate color from a yellow to a yellow-brown is noted within ten minutes.

In a second illustrative example, an ordinary photographic negative is employed to print a positive on a plate of polymethylmethacrylate containing 1% phenylnitromethane as prepared immediately above. Exposure to ultraviolet light of the polymethylmethacrylate phenylnitromethane plate maintained at a temperature of about minus (—) 70° C. while permitting the photographic negative to abut the plate, produces a positive on the plate. This is accomplished within about ten minutes at the temperature stated. The exposed portion of the plate is colored yellow-brown, whereas the unexposed portion of the polymethylmethacrylate plate remains unaffected.

It is an advantage of the present invention that a reversible light-sensitive aromatic nitromethane compound can be readily prepared in its aci-form being indefinitely maintained as a stable entity at temperatures below about minus (—) 40° C. However, the so-converted aci-compound can tautomerize by permitting the temperature to rise to room temperature. At the latter temperature the aci-compound is stable but for a short period of time.

We claim:

1. A process for the preparation of an aci-aromatic nitromethane adapted for use as a reversible light-sensitive photochromic additive to substantially colorless polymeric materials which comprises: irradiating an aromatic nitromethane in the presence of ultraviolet light from about 2500 A. units to about 4000 A. units at temperatures within the range from about minus (—) 40° C. to about minus (—) 100° C. for from about five minutes to not more than one hour, and recovering the corresponding aci-aromatic nitromethane indefinitely stable at the aforementioned temperature range, but convertible to its original form at room temperature.

2. A process according to claim 1, in which the temperature of irradiation is in the range of from minus (—) 70° C. to minus (—) 80° C. and the time for irradiation is ten minutes.

3. A process according to claim 1, in which the ultraviolet light is supplied from a sun lamp providing from 3000 A. units to about 3800 A. units.

4. A process according to claim 1, in which the aromatic nitromethane is phenylnitromethane.

References Cited in the file of this patent
UNITED STATES PATENTS
2,864,753    Chalkley _____ Dec. 16, 1958
3,022,318    Berman et al. _____ Feb. 20, 1962